Nov. 10, 1964  M. W. HUMPHREYS  3,156,535
APPARATUS FOR PRODUCTION OF FOAMED PLASTICS
Filed May 15, 1959  4 Sheets-Sheet 1

INVENTOR.
MARION W. HUMPHREYS
BY
Oberlin, Maky, & Donnelly
ATTORNEYS.

Nov. 10, 1964  M. W. HUMPHREYS  3,156,535
APPARATUS FOR PRODUCTION OF FOAMED PLASTICS
Filed May 15, 1959  4 Sheets-Sheet 2

INVENTOR.
MARION W. HUMPHREYS.
BY
Oberlin, Maky, & Donnelly
ATTORNEYS.

Nov. 10, 1964   M. W. HUMPHREYS   3,156,535
APPARATUS FOR PRODUCTION OF FOAMED PLASTICS
Filed May 15, 1959   4 Sheets-Sheet 3

INVENTOR.
MARION W. HUMPHREYS
BY
Oberlin, Maky, & Donnelly
ATTORNEYS.

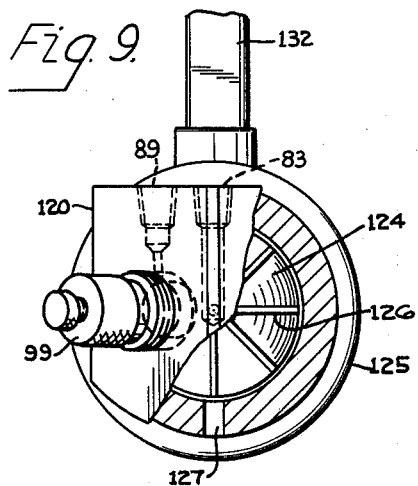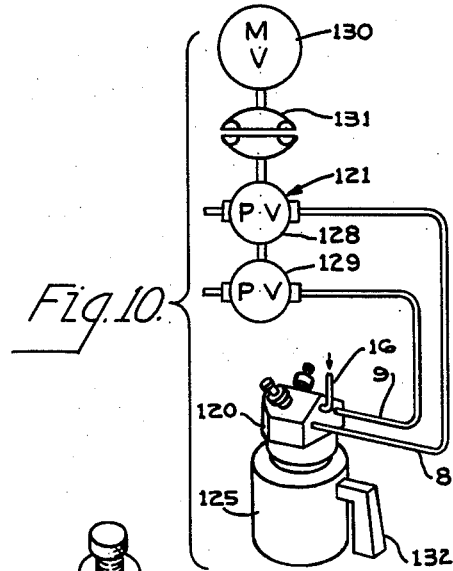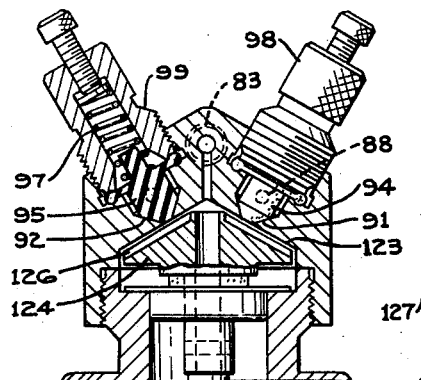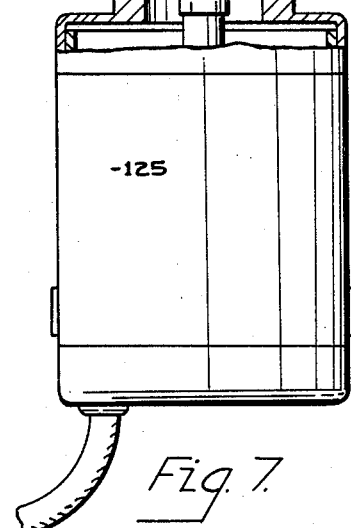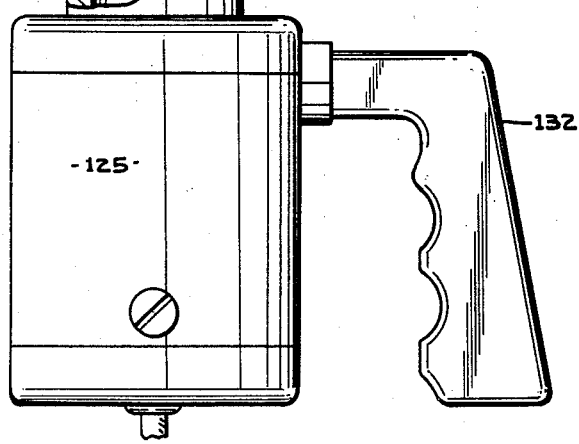

United States Patent Office 3,156,535
Patented Nov. 10, 1964

3,156,535
APPARATUS FOR PRODUCTION OF
FOAMED PLASTICS
Marion W. Humphreys, Hickory Hill Farm,
Chesterland, Ohio
Filed May 15, 1959, Ser. No. 813,482
19 Claims. (Cl. 23—285)

The present invention relates generally as indicated to apparatus for production of foamed plastics and more particularly to apparatus which includes a novel metering device to achieve precise proportioning of the raw materials required for producing a foamed product and which includes a novel mixing head to achieve thorough mixing of such raw materials, the mixture being discharged into a mold in measured amount or sprayed continuously.

Recently much work has been done in connection with equipment for foaming urethane or polyurethane plastics and, of course, there are a number of other plastics which can be expanded or foamed, for example, cellulose base plastics exocyclic resins, phenylic resins, polyethylene resins, silicone resins, styrene plastics, urea plastics, vinyl resins, and rubber base resins. The basic mechanical problems that confront a producer of plastic foam are: (1) the difficulty of achieving accurate metering of the raw materials within 1% (sometimes within ½%) so that the final product may be controlled with reference to hardness, average cell size, etc.; (2) the inability of achieving thorough mixing of the raw materials without affecting the proportioning of them; and (3) the plugging of the equipment, especially those foams which foam in place shortly after discharge from the mixing and which are self-curing in the mold or on the surface to which applied.

Although the present invention has utility with various compositions that are capable of being expanded or foamed, it has been developed particularly to obtain accurate metering of the raw materials, intimate blending of raw materials without changing the proportions thereof, and self-cleaning characteristics for use as with compositions that foam in place and are self-curing. Thus, one class of such compositions are the polyurethane foams which are prepared by reaction of polyisocyanates, polyester or polyether resins, and water, the reaction of the polyisocyanates with water liberating $CO_2$ while simultaneously polymerizing and cross-linking the resin to entrap the liberated $CO_2$. Such foams may be flexible, semi-rigid, or rigid depending on the specific raw materials that are employed and their densities may be controlled by the amount of water and excess polyisocyanate used in the formation.

As aforesaid, polyurethane foams have the advantages that they can be foamed in place (in the mold or cavity into which the mixture is poured or on the surface onto which the mixture is applied, as by spraying) and are self-cured by generation of exothermic heat during the foaming reaction, the polyisocyanate providing the source of the $CO_2$ and the cross-linking medium. A commonly used polyisocyanate is tolylene diisocyanate, for example, pure 2,4-tolylene diisocyanate, and another one in extensive use, due to its lower cost, is an 80/20 ratio of 2,4 and 2,6-isomers, and also 65/35 ratio of isomers. These foam preparations also use polyfunctional materials such as castor oils, glycols, drying oils, and polyethers. Furthermore tertiary amines such as N-methyl, N-ethyl, N-coco-morpholine, triethyl-dimethyl cyclohexyl, and diethylethanolamine are frequently used to catalyze and to control the foam reaction rates because the $CO_2$ must be liberated in linear manner and at a rate such that the $CO_2$ is entrapped by the matrix of the plastic as the latter gels. Yet other substances that are sometimes employed are emulsifiers to facilitate dispersion of the reactants and water in the mixing operation.

Accordingly, it is a primary object of this invention to provide apparatus for producing foamed plastics that are characterized by their uniformity of density, cell size, and cell distribution.

It is another object of this invention to provide apparatus of the character indicated which embodies a novel form of mixing head from which the ingredients of the foamed plastic issue in intimately mixed form for filling of individual molds or for spraying, the apparatus being further characterized in that it is self-cleaning so that it may be turned off and on any number of times without any danger of plugging or without requiring flushing.

It is another object of this invention to provide apparatus of the character indicated which embodies a novel metering device to maintain precise proportioning of the ingredients that are supplied to the mixing head for intimately mixing and blending.

It is another object of this invention to provide apparatus of the character indicated which is characterized in the provision of a novel form of distributing valve through which the various ingredients flow from supply reservoirs or tanks to the mixing head in accurately measured quantities.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

FIGS. 7, 8, and 9 are fragmentary cross-section views of another form of mixing head which is adapted for use in the spraying of the foam producing ingredients; and FIG. 10 is a schematic diagram in which another form of metering device is employed in association with the FIGS. 7, 8 and 9 mixing device.

Figure 1:
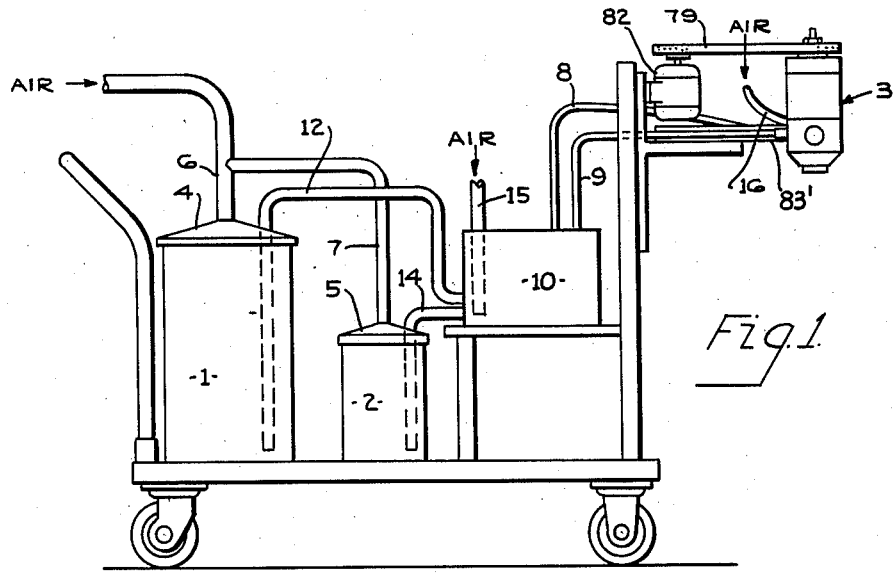
FIG. 1 is a schematic layout of the apparatus constituting the present invention, the same being shown in the form of a portable unit.

Referring now more particularly to the drawings, and first to FIG. 1, there is provided a first reservoir 1 for the resin which is to be foamed and another reservoir 2 containing the catalyst or foaming agent, and it is to be understood that in some instances it may be necessary to mix more than two ingredients at the mixing head 3 to produce a foamed plastic having the desired characteristics with reference to resiliency, cell size, etc. The reservoirs 1 and 2 are preferably closed and the covers 4 and 5 thereof have connected thereto air or gas pressure lines 6 and 7 and, of course, air may be used provided that it does not react with the fluids in the respective reservoirs 1 and 2.

In order to maintain the ingredients in the reservoirs 1 and 2 at predetermined temperatures and thus at predetermined viscosities, the reservoirs 1 and 2 are preferably submerged in a tank of heated oil or the like (not shown) and, if desired, the heating oil may be circulated by a pump (not shown) to heat the mixing head 3 and the conduits 8 and 9 leading thereto from the metering device 10. Leading from the respective reservoirs 1 and 2 to an air-operated distributing valve 11 (see FIG. 2) in the metering device 10 are the respective conduits 12 and 14 and leading from the metering device 10 to the mixing head 3 are the aforesaid conduits 8 and 9 through which metered volumes of the fluids in reservoirs 1 and 2 flow to the mixing head 3. An air line 15 also connects with the valve 11 for actuating the same in a manner to be hereinafter described and an air line 16 is connected to the mixing head from reaching the bearings thereof and to promote mixing action of the ingredients. Because the reservoirs 1 and 2 may be of known construction there is no need herein to describe in detail the clamps, gauges, regulators etc. that are usually employed therewith.

Figure 3:
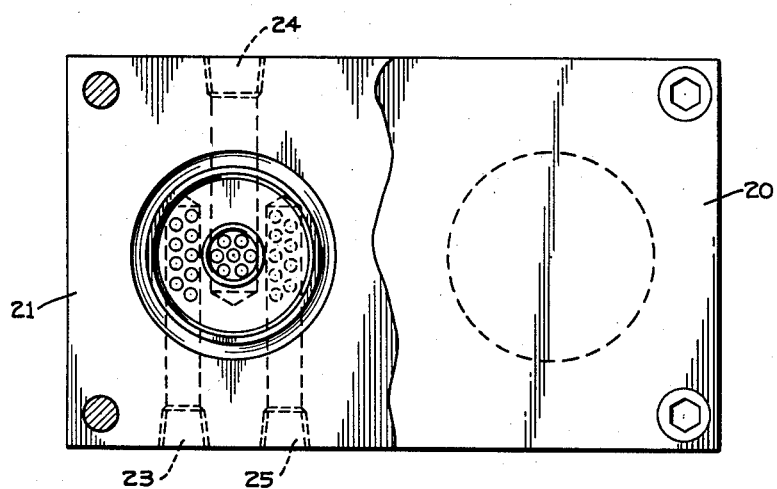
FIGS. 3 and 4 are detail views of a preferred form of distributing valve structure adapted to be mounted between the respective raw material reservoirs and the metering device.
Figure 4:
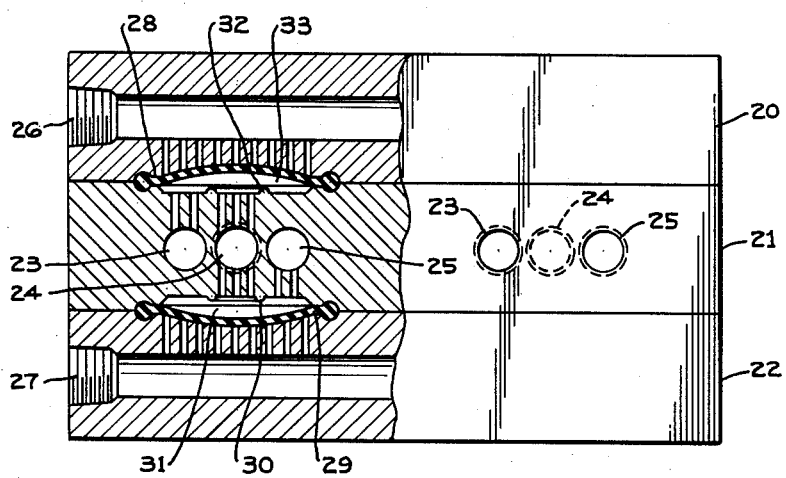

Referring now to the distributing valve 11 and, as best shown in FIGS. 3 and 4, this valve essentially comprises three metal blocks 20, 21, and 22 of which the middle one is formed with as many sets of ports as there are fluids to be mixed to form the foamed plastic. Each set of ports includes a reservoir port 23, a metering port 24, and a head port 25 respectively connected to the reservoir 1 or 2, to the metering device 10, and to the mixing head 3 as aforesaid. Bolted or otherwise secured to the middle block 21 are the top and bottom blocks 20 and 22 formed with the respective through-passages 26 and 27 for air pressure from line 15. Additionally, said blocks 20 and 22 are formed to clamp a pair of dish-shaped rubber-like diaphragms 28 and 29 in association with the sets of ports 23, 24, 25. As can be seen in the drawings, when there is air pressure in the passage 27 it will act on the bottom diaphragms 29 and will cause the center portions thereof to engage the annular seat 30 whereby the fluids in the reservoirs 1 and 2 may flow through the ports 23 and 24 via the chambers 33 under the influence of the pressure acting on the fluids in the respective reservoirs 1 and 2 and also under the influence of the intake stroke of the metering device 10 as hereinafter explained. The various ports and passages have a plurality of small diameter openings leading to the opposite sides of the diaphragms 28 and 29 so that the latter will not extrude into the ports or passages. It can also be seen that when there is air pressure in the passage 26 of the top block 20, the top diaphragm 28 will be deformed to engage the annular seats 32, whereby the fluids in the metering device 10 will flow through the ports 24 and 25 via the chambers 31 to the lines 8 and 9 connected to the mixing head 3, the supply lines 12 and 14 from the reservoirs 1 and 2 being closed by reason of the engagement of the top diaphragms 28 with the top seats 32.

Air pressure is alternately supplied in the aforesaid passages 26 and 27 as by a suitable solenoid actuated valve 34 (see FIG. 2), the control switch (not shown) of which will preferably be arranged to be actuated by the metering device 10.

Figure 2:
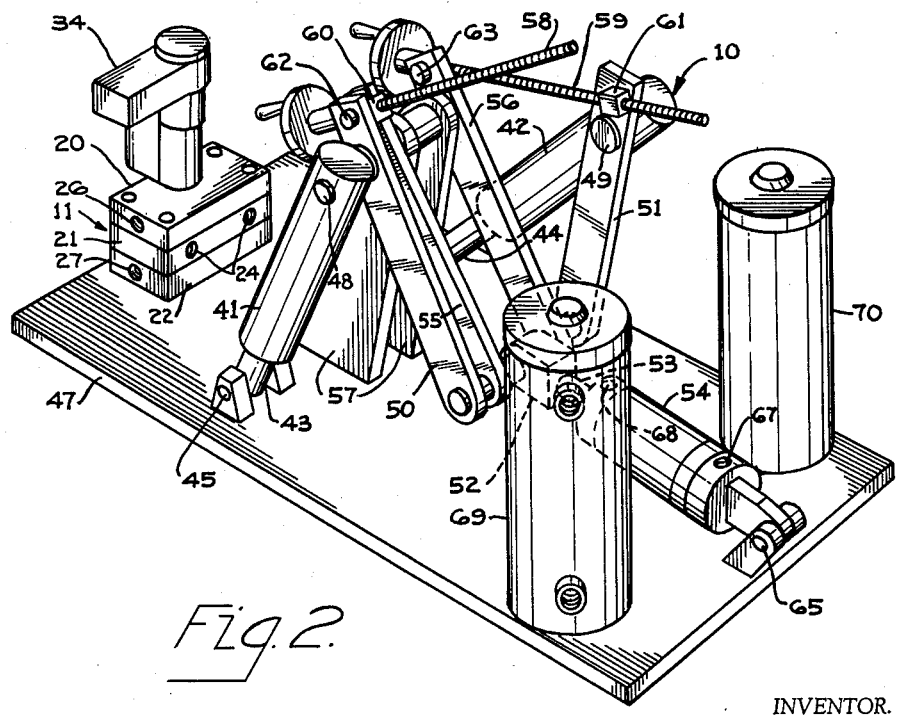
FIG. 2 is a perspective view of one form of metering device for supplying exact volumes of the ingredients for the plastic foam to the mixing head.

With reference to the metering device 10, the same, as best shown in FIG. 2, preferably includes a pair of single acting cylinders 41 and 42 which have hollow pistons rods 43 and 44 pivotally secured as at 45 to a base 47, the piston rods 43 and 44 adjacent their lower ends being formed with ports (not shown) adapted for connection as by flexible hoses to the respective metering ports 24 of the valve 11.

The cylinders 41 and 42 are mounted in tilted position, as shown, and their upper ends are pivotally mounted at 48 and 49 adjacent the upper ends of outer arms 50 and 51, the lower ends of said arms being pivotally mounted on the cross head 52 on the piston rod 53 of a double acting hydraulic cylinder 54. Inner arms 55 and 56 have their lower and upper ends respectively pivotally connected to the cross head 52 and to brackets 57 extending upwardly from base 47. Adjustment of the angles of the outer arms 50 and 51 with respect to the inner arms 55 and 56 to vary the strokes of the cylinders 41 and 42 is effected as by screw means 58 and 59 which have threaded engagement with swivel blocks 60 and 61 on the outer arms 50 and 51 and axial fixed rotary connections with the swivel blocks 62 and 63 on the inner arms. In this way, the strokes of the cylinders 41 and 42 can be adjusted to very close limits (within ½%) as required for production of foamed plastic having uniform composition.

The source of pressure for actuating cylinder 54 is preferably hydraulic oil from an air over oil accumulator system including a pair of accumulators 69 and 70 each having an air port at the top and an oil port at the bottom, the oil ports being connected to the respective cylinder ports 67 and 68. The accumulator air ports will be connected with the respective ports 26 and 27 of the valve 11.

Thus, as viewed in FIG. 2, when the piston rod 53 moves toward the right, the cylinders 41 and 42 will be extended with respect to the pistons 43 and 44 whereby the fluid in the respective reservoirs 1 and 2 flows through the distributing valve 11 into the respective cylinders 41 and 42 in quantities as precisely determined by the strokes thereof. On the other hand, when the piston rod 53 moves to the left, the cylinders 41 and 42 are moved downwardly to displace the respective fluids therein through the distributing valve 11 and to the mixing head 3.

Figure 6:
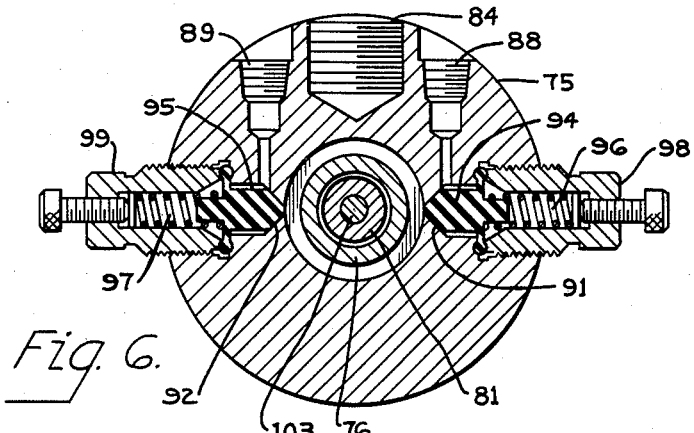
FIGS. 5 and 6 are cross-section views of a mixing and delivery head adapted for use in the production of foamed plastics as in individual molds.
Figure 5:
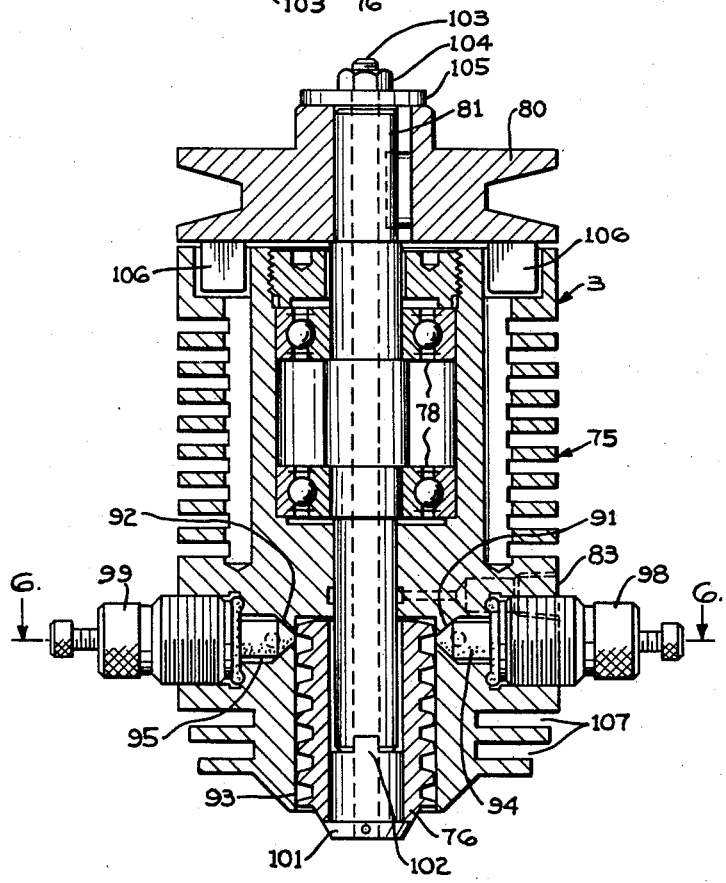

Referring now to the mixing head 3 as shown in detail in FIGS. 5 and 6, it essentially comprises a cylindrical block 75 in which a rotating mixer 76 is journalled as on anti-friction bearings 78, the mixer 76 being adapted to be driven at very high speeds e.g. 5000 r.p.m., as by a belt 79 trained on the sheave 80 on the mixer drive shaft 81 and a sheave on the electric drive motor 82. The air line 16 connects with the port 83 which leads to shaft 81 beneath the bottom bearing 78 to assist in the mixing operation and also to keep the fluids which are to be mixed by the mixer 76 from getting up into the bearings 78 of the mixing head 3.

The mixing head 3 is supported on a longitudinally adjustable bar 83' which is screwed into the port 84 of the mixing head 3. The conduits 8 and 9 from the metering device 10 are connected to the respective ports 88 and 89 which provide conical passages 91 and 92 which intersect the upper cylindrical wall portion of the mixing chamber 93 in which the mixing member 76 rotates. Seated in such passages 91 and 92 are the diaphragm-type valve members 94 and 95 of rubber-like material having inner ends which are flush with the chamber wall 93 and in contact with the periphery of member 76 when said valve members are urged to seated position by adjustable springs 96 and 97. The beaded edges of said valve members are clamped as by threaded bushings 98 and 99 so that when the fluids to be mixed are pumped from the metering device 10 through lines 8 and 9, the pressure thereof will, in acting on the diaphragm portions of said valve members 94 and 95, deform them away from the conical seats 91 and 92 thereby permitting flow of the respective fluids into the mixing chamber 93 at diametrically opposite points. It is to be understood that more than two fluids may be supplied under pressure into the mixing chamber 93.

The mixing member 76 herein shown is in the form of a feed screw provided with double external threads which may have a major diameter to freely rotate in the mixing chamber 93 and it has been found that a small radial clearance of for example .010" is desirable. There is a plug 101 tightly fitted in the lower end of the mixing member 76 to provide a drive key 102 to engage in the slotted lower end of the drive shaft 81, said plug having pinned thereto a rod 103 which, through the nut 104 and washer 105, serves to hold the plug and mixing member in place in driving engagement with shaft 81.

In order to cool the bearings 78, the body 75 is finned as shown and the sheave 80 has vanes 106 to induce air circulation along the wall of the bearing housing. On the other hand, if heating of the mixing chamber 93 is desired instead of cooling then suitable heating elements may be positioned in the grooves 107 as previously mentioned in connection with FIG. 1 so as to heat this portion of the mixing head to say a temperature of 200° F. for many foamed plastic raw materials.

Having thus described the construction of one form of mixing head 10 in detail, the operation thereof will now be described. When the feed screw or mixing member 76 is of about 1¾" diameter formed with ¼" pitch double threads of generally Acme type and is rotated at about 5000 r.p.m., only extremely thin films of the respective fluids will be distributed on the faces of the threads thereby intimately mixing such fluids and causing the same to be fed downwardly by the threads and by gravity and to be thrown out by centrifugal force whereby the uniform and thorough mixture of raw materials drops freely as an annular stream from the lower end of the mixing member 76. In the case of foamed polyurethane this mixture may be discharged directly into a mold where it will in a short time expand and cure by itself. Because the raw materials are accurately metered in respect of total volumes and percentages with respect to one another in the metering device 10 and because these metered raw materials are so uniformly and thoroughly mixed in the mixing head 3 there are produced uniform products insofar as composition, density, cell size, cell distribution, etc. are concerned. Moreover, the raw materials are kept separated from one another except at the very instant that they enter the mixing chamber 93 so that it is of no concern that the flow of the raw materials is intermittent from the reservoirs 1 and 2 into the metering device 10 and from the metering device 10 to the mixing head 3.

The mixing head 3 herein is self-cleaning by centrifugal force and the heating of the lower end also helps maintain the mixture more fluid so as to drain freely and completely. However, even if a layer of the mixture should cling to the wall 93, the continuous rotation of the mixing member 76 will prevent the foamed material from hampering the operation, and of course, the tips of the valve members 94 and 95 are kept clean by the threads so that there is no problem of plugging of the passages 91 and 92.

I have found that the molded, expanded articles may be readily removed from the molds by providing a paraffin or like coating on the mold surfaces and then heating the molds after the plastic has been foamed and cured. In the case of polyurethane plastics, for example, they are self-foaming and self-curing so that no separate foaming or curing operations are required after the raw material mixture has been poured into the molds.

Resins of the character indicated are frequently applied on the surfaces of articles and for that purpose it has been found desirable to spray the raw material mixture directly on the surfaces of such articles. The polyurethane resins are well suited to this purpose since they adhere strongly on any wax and oil free surface. The mixing device 120 and the metering device 121 respectively illustrated in FIGS. 7, 8, 9 and 10 are designed for such spraying operation.

The mixing device 120 employs the same general principles as that of FIGS. 5 and 6 and therefore the same reference numerals have been used to denote the diaphragm-type valves, the air and fluid inlet ports, etc. A primary difference is that the mixing chamber 123 is conical and the mixing member 124 which is driven by the electric motor 125 is in the form of a conical impeller having radiating vanes 126 against which the respective streams of fluid from passages 91 and 92 are directed for uniform and thorough mixing. Again, the impeller 124 will be rotated at high speeds, say 5000 r.p.m., whereby the mixture of fluids will be thrown out centrifugally through the peripheral discharge passage 127 in spray form against the article which is to have the foamed plastic coating. The mixing device 120 of course, is self-cleaning.

The metering device 121 may be employed in connection with the mixing device 3, if desired and basically comprises variable delivery pumps 128 and 129, such as those disclosed in my Pat. No. 2,782,724 driven by the motor 130 through a hydraulic or like transmission unit 131. The pumps 128 and 129 will be operative to pump the respective fluids from the reservoirs 1 and 2 in accurately metered proportions to the mixing head 3 or 120 via the lines 8 and 9. The handle 132 may be provided with a suitable switch (not shown) to energize and de-energize the motor 130.

In conclusion, it can be seen that I have provided an apparatus which employs metering means by which two or more raw materials for foamed plastics may be supplied in prescribed amounts, within ½% or closer, for mixing, and which self-cleaning, non-plugging mixing means for uniformly and thoroughly mixing such metered materials without affecting their proportions so as to achieve uniform characteristics in the end product.

Other modes of applying the principle of the invention may be employed, change being made as regards the details described, provided the features stated in any of the following claims, or the equivalent of such, be employed.

I therefore particularly point out and distinctly claim as my invention:

1. Apparatus for production of foamed plastic from a mixture of fluids comprising a mixing device formed with a mixing chamber, with a plurality of inlet ports for conducting the respective fluids into such chamber, and with an outlet for discharge of the mixture from such chamber, and a high speed rotary member in such chamber, such inlet ports extending axially transversely thereof and arranged to deposit thin layers of the respective fluids from such inlet ports successively directly thereon for intimate mixing and to convey such mixture to such outlet, said rotary member having a major diameter affording only a small radial clearance in such chamber.

2. The apparatus of claim 1 wherein said rotary member is in the form of a feed screw having a peripheral speed, in relation to the velocities of the fluids entering the mixing chamber through such inlet ports, such that thin layers of such fluids are successively deposited in the grooves of said feed screw for mixing and for axial advance toward such outlet.

3. The apparatus of claim 1 wherein said rotary member is in the form of an impeller with vanes radiating therefrom so as to pick up thin layers of the respective fluids in the spaces between successive vanes for intimate mixing and for centrifugal conveying to such outlet.

4. The apparatus of claim 1 wherein a metering device is provided to supply prescribed proportions of such fluids to said mixing device.

5. The apparatus of claim 4 wherein said metering device comprises a plurality of single acting cylinders and associated valves so arranged that when said cylinders are extended, the respective fluids are supplied thereinto from supply sources and when retracted, such fluids are displaced to said mixing device, means for actuating said cylinders, and means for independently adjusting the strokes of said cylinders to vary the proportions of the fluids delivered to said mixing device.

6. The apparatus of claim 4 wherein said metering device comprises a plurality of variable capacity reciprocating pumps effective to supply prescribed proportions of the fluids to said mixing device.

7. Apparatus for production of foamed plastic from a mixture of fluids comprising a plurality of reservoirs for the respective fluids, a metering device having inlet ports in communication with the fluids in the respective reservoirs and outlet ports from which the fluids are displaced in predetermined proportions, and a mixing device having inlet ports in communication with the respective outlet ports of said metering device, a mixing chamber to which such inlet ports lead, a high speed rotary member in such chamber, such inlet ports extending axially transversely thereof, and an outlet port from which the mixture of such fluids in said chamber is discharged, said rotary member having only a very small radial clearance so that such inlet ports are swept by said rotary member to have the respective fluids directly deposited thereon.

8. The apparatus of claim 7 wherein said high speed rotary member is a rotary feed screw into the grooves of which such inlet ports lead for successive deposit of thin films for mixing and for axial conveying by the threads to such outlet of said mixing device.

9. The apparatus of claim 7 wherein said high speed rotary device has a cone-shaped high speed rotary vaned impeller into the spaces between successive vanes on the conical surfaces thereof such inlet ports lead for successive deposit of thin films for mixing and for centrifugal conveying by the vanes to such outlet of said mixing device, such inlet ports extending normal to said conical surface.

10. Apparatus for production of foamed plastic from a mixture of fluids comprising a mixing device formed with a mixing chamber, with a plurality of inlet ports extending axially transversely of said chamber for conducting the respective fluids thereinto, and with an outlet for discharge of said mixture; a rotary member in said chamber effective to mix such fluids entering said chamber through said inlet ports and to convey the mixture to said outlet; and pressure-actuated valves in the respective inlet ports having inner ends which, in the closed positions of said valves, are substantially flush with the wall of said chamber and in close proximity to surfaces of said rotary member.

11. The apparatus of claim 10 wherein said valves are of the spring-seated diaphragm type having frusto-conical seat portions, and wherein said inlet ports provide conical seats that are complemental with the seat portions of said valves.

12. The apparatus of claim 11 wherein said conical seats provide sharp edges at their intersections with the wall of said chamber whereby to render said mixing device self-cleaning as said rotary member continues to rotate after said valves are moved to closed position.

13. Apparatus for production of foamed plastic from a mixture of fluids comprising a plurality of reservoirs for the respective fluids, a metering device having inlet ports in communication with the fluids in the respective reservoirs and outlet ports from which the fluids are displaced in predetermined proportions, a mixing device having inlet ports in communication with the respective outlet ports of said metering device, a mixing chamber to which said inlet ports lead, an outlet port from which the mixture of such fluids in said chamber is discharged, pressure-operated check valves operatively associated with said metering device to conduct such fluids first from said reservoirs to said metering device and thence from said metering device to said mixing device, said metering device comprising a plurality of piston-cylinder assemblies, which, when actuated in opposite directions displace the respective fluids thereinto from said reservoirs and therefrom to said mixing device, means to vary the strokes of said piston-cylinder assemblies and means to so actuate said assemblies through their adjusted strokes to thus supply predetermined volumes of such fluids to said mixing device through said check valves.

14. The apparatus of claim 13 wherein said last-mentioned means comprises a double-acting cylinder operatively linked with said assemblies.

15. Apparatus for production of foamed plastic from a mixture of fluids comprising a plurality of reservoirs for the respective fluids, a metering device having inlet ports in communication with the fluids in the respective reservoirs and outlet ports from which the fluids are displaced in predetermined proportions, a mixing device having inlet ports in communication with the respective outlet ports of said metering device, a mixing chamber to which such inlet ports lead, a high speed rotary member in such chamber, such inlet ports extending axially transversely thereof, and an outlet port from which the mixture of such fluids in said chamber is discharged, said metering device comprising variable delivery pumps, and drive means for said pumps.

16. The apparatus of claim 15 wherein said pumps comprise piston-cylinder assemblies, and means for varying the strokes thereof.

17. The apparatus of claim 15 wherein said pumps comprise rotary pumps, and a hydraulic transmission through which torque is transmitted from said drive means to said pumps.

18. The apparatus of claim 15 wherein said drive means includes a hydraulic transmission for transmitting actuating force to said pumps.

19. Apparatus for production of foamed plastic from a mixture of fluids comprising a plurality of reservoirs for the respective fluids, a metering device having inlet ports in communication with the fluids in the respective reservoirs and outlet ports from which the fluids are displaced in predetermined proportions, a mixing device having inlet ports in communication with the respective outlet ports of said metering device, a mixing chamber to which such inlet ports lead, an outlet port from which the mixture of said fluids in said chamber is discharged, pressure operated check valves operatively associated with said metering device to conduct such fluids first from said reservoirs to said metering device and thence from said metering device to said mixing device, and a control valve associated with said check valves for the selective operation thereof.

References Cited in the file of this patent

UNITED STATES PATENTS

| | | |
|---|---|---|
| 2,764,565 | Hoppe et al. | Sept. 25, 1956 |
| 2,768,405 | Mineah | Oct. 30, 1956 |
| 2,768,815 | Weaver | Oct. 30, 1956 |
| 2,814,827 | Snow et al. | Dec. 3, 1957 |
| 2,802,648 | Christinsen et al. | Aug. 13, 1957 |
| 2,868,518 | Corby et al. | Jan. 13, 1959 |
| 2,894,732 | Taber et al. | July 14, 1959 |
| 2,895,644 | Paude | July 21, 1959 |
| 2,958,516 | Wall et al. | Nov. 1, 1960 |